(12) United States Patent
Ben et al.

(10) Patent No.: US 8,389,668 B2
(45) Date of Patent: Mar. 5, 2013

(54) USE OF A CATALYTIC SYSTEM FOR LACTIDE AND GLYCOLIDE (CO) OLIGOMERIZATION

(75) Inventors: Frédéric Ben, Toulouse (FR); Didier Bourissou, Plaisance du Touch (FR); Roland Cherif-Cheikh, Castelldefels (ES); Anne De Sousa Delgado, Moilins de Rei (ES); Magalie Graullier, Toulouse (FR); Blanca Martin-Vaca, Toulouse (FR)

(73) Assignee: Ipsen Pharma S.A.S., Boulogne-Billancourt (FR)

( * ) Notice: Subject to any disclaimer, the term of this patent is extended or adjusted under 35 U.S.C. 154(b) by 0 days.

(21) Appl. No.: 10/599,020

(22) PCT Filed: Mar. 15, 2005

(86) PCT No.: PCT/FR2005/000616
§ 371 (c)(1),
(2), (4) Date: Sep. 18, 2006

(87) PCT Pub. No.: WO2005/100439
PCT Pub. Date: Oct. 27, 2005

(65) Prior Publication Data
US 2007/0185304 A1    Aug. 9, 2007

(30) Foreign Application Priority Data
Mar. 16, 2004 (FR) .................................. 04 02671

(51) Int. Cl.
*C08G 63/08* (2006.01)
(52) U.S. Cl. ......... 528/354; 528/357; 502/158; 502/159
(58) Field of Classification Search .................. 528/354, 528/357, 361, 356; 524/260; 502/158, 159
See application file for complete search history.

(56) References Cited

U.S. PATENT DOCUMENTS

| | | | | |
|---|---|---|---|---|
| 3,047,524 A | * | 7/1962 | Bowman | 524/260 |
| 4,273,920 A | * | 6/1981 | Nevin | 528/361 |
| 5,798,436 A | * | 8/1998 | Gruber et al. | 528/354 |
| 6,355,772 B1 | * | 3/2002 | Gruber et al. | 528/354 |

FOREIGN PATENT DOCUMENTS

| | | |
|---|---|---|
| EP | 0 624 613 | 11/1994 |
| EP | 0 624 613 A2 | 11/1994 |
| JP | 58-013624 | 1/1983 |
| JP | 7-233246 | 7/1995 |
| JP | 7-504939 | 7/1995 |
| WO | WO 94/07949 | 4/1994 |

* cited by examiner

*Primary Examiner* — James Seidleck
*Assistant Examiner* — Gregory Listvoyb
(74) *Attorney, Agent, or Firm* — Hunton & Williams LLP

(57) ABSTRACT

The use of a catalytic ring-opening lactide and glycolide (co)oligomerization system consisting of a strongly acidic ion-exchange resin-type polymeric catalyst and a (co)oligomerization additive, and a lactide and glycolide (co)oligomerization method using said catalytic system, are disclosed.

15 Claims, No Drawings

USE OF A CATALYTIC SYSTEM FOR LACTIDE AND GLYCOLIDE (CO) OLIGOMERIZATION

CROSS-REFERENCE TO RELATED APPLICATIONS

This application claims priority to PCT/FR2005/000616 filed Mar. 15, 2005, and French Application FR 0402671, filed Mar. 16, 2004, which are incorporated herein by reference.

BACKGROUND OF THE INVENTION (i) Field of the Invention

The present invention relates to the use of a system constituted by a strongly acidic ion-exchange resin as catalyst and a (co)oligomerization additive, as a catalytic ring-opening lactide and glycolide (co)oligomerization system. The present invention also relates to a lactide and glycolide (co) oligomerization method comprising the use of such a catalytic system.

(ii) Description of Related Art

Nowadays, increasing attention is given to synthetic polymers for the production of artificial organs and the formulation of medicaments [*Chem. Eng. News* 2001, 79 (6), 30]. The polymers concerned must meet a certain number of criteria and, in particular, they must be biocompatible. The biodegradable characteristic is an additional advantage if the polymer must be eliminated after an appropriate period of implantation in an organism. In this regard, the copolymers based on lactic and glycolic acid (PLGA) are of great interest because they are sensitive to hydrolysis and are degraded in vivo with the release of non-toxic by-products. The field of application of the PLGA's is very wide (*Adv. Mater.* 1996, 8, 305 and *Chemosphere* 2001, 43, 49). In the surgical field, they are used for the synthesis of multistrand threads, sutures, implants, prostheses, etc. In pharmacology, they allow the encapsulation, the transfer and the controlled release of active ingredients.

For all these applications, the key factor is the rate of degradation of the PLGA which of course depends on their structure (chain length, dispersity, proportion, stereochemistry and chain formation of monomers, etc). In recent years, numerous works have therefore targeted the development of catalysts and/or promoters of (co)polymerization, i.e. for polymerization or copolymerization, of lactide and glycolide allowing the preparation of PLGA with a controlled structure.

The use of metal systems usually leads to a contamination of the copolymers thus obtained through the presence of metallic salts, which sometimes constitutes a serious limitation depending on the envisaged applications. The development of non-metal systems allowing the controlled (co)polymerization of lactide and glycolide is therefore a significant issue. The present invention fits into this category and relates more particularly to low-mass lactide and glycolide (co)polymers, i.e. lactide and glycolide (co)oligomers.

SUMMARY OF THE INVENTION

The applicant therefore proposes the use of a simple catalytic system, constituted by a catalyst and a (co)oligomerization additive, and which makes it possible to control the chain length but also the nature of the chain ends of the prepared (co)oligomers. The use of an ion-exchange resin as catalyst allows the oligomers to be separated from the catalyst in a simple and effective manner, the catalyst being able to be reused without loss of activity.

DETAILED DESCRIPTION OF PREFERRED EMBODIMENTS

The subject of the present invention is therefore the use of a catalytic system constituted by
(a) a strongly acidic ion-exchange resin-type polymeric catalyst (1), and
(b) a (co)oligomerization additive of general formula (2)

$$R^1\text{-E-}R^2 \tag{2}$$

in which
E represents an element of group 16;
$R^1$ represents a hydrogen or deuterium atom;
$R^2$ represents a hydrogen or deuterium atom, or a group of formula $-E_{14}(R_{14})(R'_{14})(R''_{14})$;
$E_{14}$ is an element of group 14;
$R_{14}$, $R'_{14}$ and $R''_{14}$ represent, independently, the hydrogen atom; the deuterium atom; one of the following substituted or non-substituted radicals: alkyl, cycloalkyl or aryl, and in which said substituent or substituents are chosen from: halo, hydroxy, alkyl, alkoxy, cycloalkyl, cycloalkoxy, aryl, aryloxy, carboxy, alkoxycarbonyl, cycloalkoxycarbonyl and aryloxycarbonyl,
for the (co)oligomerization of lactide and glycolide by ring opening.

The expression halo means fluoro, chloro, bromo or iodo, and preferably chloro. The expression alkyl represents an alkyl radical with 1 to 20 carbon atoms. This expression covers the alkyl radicals having 1 to 6 linear or branched carbon atoms and in particular the alkyl radicals having 1 to 4 carbon atoms such as the methyl, ethyl, propyl, isopropyl, butyl, isobutyl, sec-butyl and tert-butyl radicals. The expression also covers the radicals comprising more than 6 carbon atoms such as the heptyl, octyl, nonyl, decyl, undecyl, docecyl, tridecyl, tetradecyl, pentadecyl, hexadecyl, heptadecyl, octadecyl, nonadecyl and eicosyl radicals.

The term alkoxy refers to the radicals in which the alkyl radical is a radical with 1 to 6 carbon atoms as defined above such as for example the methoxy, ethoxy, propyloxy or isopropyloxy radicals but also the linear, secondary or tertiary butoxy and pentyloxy radicals. The term alkoxycarbonyl preferably designates the radicals in which the alkoxy radical is as defined above such as for example methoxycarbonyl, ethoxycarbonyl.

The cycloalkyl radicals are chosen from saturated or unsaturated monocyclic cycloalkyls. The saturated monocyclic cycloalkyl radicals can be chosen from the radicals having 3 to 7 carbon atoms such as the cyclopropyl, cyclobutyl, cyclopentyl, cyclohexyl or cycloheptyl radicals. The unsaturated cycloalkyl radicals can be chosen from the cyclobutene, cyclopentene, cyclohexene, cyclopentadiene, cyclohexadiene radicals. The term cycloalkoxy designates the radicals in which the cycloalkyl radical is as defined above such as for example the cyclopropyloxy, cyclobutyloxy, cyclopentyloxy, cyclohexyloxy, cycloheptyloxy, cyclobutenyloxy, cyclopentenyloxy, cyclohexenyloxy, cyclopentadienyloxy, cyclohexadienyloxy radicals. The term cycloalkoxycarbonyl designates the radicals in which the cycloalkoxy radical is as defined above such as for example the cyclopropyloxycarbonyl, cyclobutyloxycarbonyl, cyclopentyloxycarbonyl, cyclohexyloxycarbonyl, cycloheptyloxycarbonyl, cyclobutenyloxycarbonyl, cyclopentenyloxycarbonyl, cyclohexenyloxycarbonyl radicals.

The aryl radicals can be of the mono- or polycyclic type. The monocyclic aryl radicals can be chosen from the phenyl radicals optionally substituted by one or more alkyl radicals such as tolyl, xylyl, mesityl, cumenyl. The polycyclic aryl radicals can be chosen from the naphthyl, anthryl, phenanthryl radicals. The term aryloxy designates the radicals in which the aryl radical is as defined above such as for example the phenyloxy, tolyloxy, naphthyloxy, anthryloxy and phenanthryloxy radicals. The term aryloxycarbonyl preferably designates the radicals in which the aryloxy radical is as defined above, such as for example phenyloxycarbonyl, tolyloxycarbonyl.

In the present application, the term (co)oligomerization means oligomerization or cooligomerization with degrees of polymerization (DP) less than 30. Thus the (co)oligomerization of lactide and of glycolide covers the oligomerization of lactide, the oligomerization of glycolide but also the cooligomerization of lactide and glycolide.

Preferably, in a catalytic system according to the present invention, the quantity of monomer relative to the (co)oligomerization additive is comprised between 2 and 30 molar equivalents and, very preferably, between 4 and 10 molar equivalents.

A subject of the invention is more particularly the use of a catalytic system as defined above, characterized in that the polymeric catalyst (1) is a styrene and divinylbenzene-based macroreticular resin with sulphonic acid functions.

Preferably, in a catalytic system as defined above, the polymeric catalyst (1) is a macroreticular resin of the Amberlyst® or Dowex® type, and very preferably a resin of the Amberlyst® type.

According to the present invention, the (co)oligomerization additive of formula (2) thus used plays the role of initiator (or promoter) of (co)oligomerization. Its presence is indispensable because in the absence of such a compound of formula (2), the (co)oligomerization reactions are much slower, lead to much smaller yields, are not reproducible, and therefore cannot be exploited industrially.

A subject of the invention is more particularly the use of a catalytic system as defined above, characterized in that the compound of general formula (2) is such that
E represents an oxygen or sulphur atom;
$R^1$ represents a hydrogen atom;
$R^2$ represents a hydrogen atom or a group of formula -$E_{14}(R_{14})(R'_{14})(R''_{14})$;
$E_{14}$ is a carbon or silicon atom;
$R_{14}$, $R'_{14}$ and $R''_{14}$ represent, independently, the hydrogen atom, or one of the following substituted or non-substituted radicals: alkyl, cycloalkyl or aryl, in which said substituent or substituents are chosen from: halo, alkyl, cycloalkyl, phenyl, naphthyl, carboxy and alkoxycarbonyl,
and more particularly,
E represents an oxygen atom;
$R^1$ represents a hydrogen atom;
$R^2$ represents a hydrogen atom or a group of formula -$E_{14}(R_{14})(R'_{14})(R''_{14})$;
$E'_{14}$ is a carbon atom;
$R_{14}$, $R'_{14}$ and $R''_{14}$ represent, independently, the hydrogen atom, or a substituted or non-substituted alkyl radical in which said substituent or substituents are chosen from alkyl, carboxy and alkoxycarbonyl;
and very preferably
E represents an oxygen atom;
$R_1$ a hydrogen atom;
$R^2$ a hydrogen atom or a group of formula -$E_{14}(R_{14})(R'_{14})(R''_{14})$ in which $E_{14}$ represents a carbon atom and $R_{14}$, $R'_{14}$ and $R''_{14}$ represent, independently, the hydrogen atom or an alkyl radical.

A subject of the invention is more particularly the use of a catalytic system as defined above and characterized in that the (co)oligomerization additive of general formula (2) is either water or an alcohol. According to the present invention, this alcohol has the formula $R^2$—OH in which $R^2$ is as defined above. Among the alcohols, there can be mentioned for example methanol, ethanol, n-propanol, isopropanol, n-butanol, pentan-1-ol, longer chain alcohols such as dodecanol or substituted alcohols such as ethyl lactate. Preferably, the alcohol used in a catalytic system as defined above is an aliphatic alcohol and very preferably the aliphatic alcohol is chosen from isopropanol, pentan-1-ol and dodecan-1-ol.

A subject of the invention is also a ring-opening lactide and glycolide (co)oligomerization method, which method consists of bringing together the monomer or monomers considered, a catalytic system as defined above constituted by a strongly acidic ion-exchange resin-type polymeric catalyst (1) and a (co)oligomerization additive of general formula (2) in an oligomerization solvent.

The reaction solvent is chosen from the solvents which do not interfere with the catalytic reaction itself. By way of example of such solvents, aromatic hydrocarbons (such as toluene, a xylene or mesitylene), optionally substituted by one or more nitro groups (such as nitrobenzene), ethers (such as methyltertiobutylether, tetrahydrofuran or dioxane), aliphatic or aromatic halides (such as dichloromethane, chloroform, dichloroethane or a dichlorobenzene) can be mentioned.

According to the method of the present application, the reactions are carried out at temperatures comprised between −20° C. and approximately 150° C., preferably between 20° C. and 80° C. The reaction times are comprised between one hour and 64 hours, and preferably between 14 hours and 48 hours. The quantity of monomer relative to the (co)oligomerization additive is comprised between 2 and 30 molar equivalents and, very preferably, between 4 and 10 molar equivalents. The yield of a (co)oligomerization method according to the present invention is generally greater than 80% and can even reach 100% in relatively mild conditions (40° C., a few hours) as illustrated in the examples.

Another subject of the invention is, more particularly, a lactide and glycolide (co)oligomerization method as defined above, with a catalytic system as defined above and in which the polymeric catalyst (1) is a styrene and divinylbenzene-based macroreticular resin with sulphonic acid functions. Preferably, the polymeric catalyst (1) is a macroreticular resin of the Amberlyst® or Dowex® type, and very preferably a resin of the Amberlyst® type.

Another subject of the invention is, more particularly, a (co)oligomerization method as defined above, with a catalytic system as defined above and the compound of general formula (2) in which
E represents an oxygen or sulphur atom;
$R^1$ represents a hydrogen atom;
$R^2$ represents a hydrogen atom or a group of formula -$E_{14}(R_{14})(R'_{14})(R''_{14})$;
$E_{14}$ is a carbon or silicon atom;
$R_{14}$, $R'_{14}$ and $R''_{14}$ represent, independently, the hydrogen atom, or one of the following substituted or non-substituted radicals: alkyl, cycloalkyl or aryl, in which said substituent or substituents are chosen from: halo, alkyl, cycloalkyl, phenyl, naphthyl, carboxy and alkoxycarbonyl, and more particularly,
E represents an oxygen atom;
$R^1$ represents a hydrogen atom;
$R^2$ represents a hydrogen atom or a group of formula $-E_{14}(R_{14})(R'_{14})(R''_{14})$;

$E'_{14}$ is a carbon atom;
$R_{14}$, $R'_{14}$ and $R''_{14}$ represent, independently, the hydrogen atom, or a substituted or non-substituted alkyl radical in which said substituent or substituents are chosen from alkyl, carboxy and alkoxycarbonyl;
and very preferably
E represents an oxygen atom;
$R^1$ a hydrogen atom;
$R^2$ a hydrogen atom or a group of formula $-E_{14}(R_{14})(R'_{14})(R''_{14})$ in which $E_{14}$ represents a carbon atom and $R_{14}$, $R'_{14}$ and $R''_{14}$ represent, independently, the hydrogen atom or an alkyl radical.

A subject of the invention is more particularly a lactide and glycolide (co)oligomerization method as defined above, with a catalytic system in which the (co)oligomerization additive is either water or an alcohol. Preferably, the alcohol is an aliphatic alcohol and very preferably the aliphatic alcohol is chosen from isopropanol, pentan-1-ol and dodecan-1-ol.

The ring-opening lactide and glycolide (co)oligomerization method according to the present invention therefore makes it possible to control the nature of the chain ends of the (co)oligomers and is particularly suitable for obtaining (co) oligomers with acid-alcohol or ester-alcohol ends as illustrated in the experimental part. At the end of the reaction, the resin can be separated from the oligomer by simple filtration of the medium and the resin thus recovered can be reused without loss of activity.

The lactide and glycolide (co)oligomerization method according to the present invention is particularly suitable for obtaining (co)oligomers with a mass comprised between 300 and 5 000 Dalton, more particularly between 500 and 3 000 Dalton.

The lactide and glycolide (co)oligomerization method according to the present invention presents many advantages, in particular,
- the catalytic system is constituted by a strongly acidic ion-exchange resin and a (co)oligomerization additive which are easily accessible and inexpensive;
- the use of an additive as (co)oligomerization initiator makes it possible not only to improve very significantly the (co)oligomerization procedure but also to precisely control the chain length which is practically equal to the initial monomer to initiator ratio;
- the use of an additive as (co)oligomerization initiator also makes it possible to control the nature of the chain ends of the prepared (co)oligomers;
- the (co)oligomerization can be carried out under relatively mild temperature conditions, such as 40° C., without the reaction times required for an almost total conversion of the monomer or monomers exceeding a few hours and at most 48 hours;
- the mass distribution of the (co)oligomers obtained is very small; the polydispersity indexes of the (co)oligomers obtained according to the present invention are in fact comprised between 1.0 and 1.4;
- the (co)oligomers obtained can be easily, rapidly and effectively purified without modification of their properties, the resin being quantitatively eliminated by simple filtration.
- the resin thus recovered retains its properties and it can be reused without a loss of activity being observed.

The invention finally relates to lactide and glycolide oligomers or co-oligomers obtained or capable of being obtained using a method as described above. Such (co)oligomers have a low mass comprised between 300 and 5 000 Dalton, and more particularly between 500 and 3 000 Dalton. Such (co) oligomers can also have controlled acid-alcohol or ester-alcohol ends.

The products of general formulae (1) and (2) are commercially available or can be produced by the methods known to a person skilled in the art.

Unless defined otherwise, all the technical and scientific terms used in the present application have the same meaning as that usually understood by a specialist in the field to which the invention belongs. Similarly, all the publications, patent applications and all other references mentioned in the present application, are incorporated by way of reference.

EXAMPLES

The following examples are presented in order to illustrate the above procedures and should in no event be considered as a limit to the scope of the invention.

Example 1

Preparation of a (D,L-lactide) Oligomer with Ester-Alcohol Ends (Mw Close to 1 000 Da)

3.00 g of D,L-lactide (0.021 mol), 20 mL of dichloromethane, 3.00 g of Amberlyst® 15 resin (0.0135 mol of acid) and 0.41 mL of pentan-1-ol (0.0037 mol) are successively introduced into a Schlenk tube equipped with a magnetic stirrer and purged under argon. The reaction mixture is left under stirring at 40° C. for 45 hours. The oligomers are characterized by proton NMR; conversion of the monomer is greater than 95%. The reaction medium is filtered in order to eliminate the resin and the solvent is evaporated off under reduced pressure. The residue is taken up in dichloromethane (1 mL) and poured under stirring into pentane (15 mL). The supernatant is eliminated and, after drying under vacuum, 2.8 g of oligomers (83%) are obtained in the form of a colourless viscous liquid. According to a GPC analysis (Gel Permeation Chromatography) using a calibration produced using polystyrene standards (PS) with masses of 400 to 400 000, the sample is composed of oligomers having neighbouring masses (Mw=1 036 Dalton, Mw/Mn=1.22). The nature of the ester-alcohol chain ends is determined by mass spectrometry (ionization by electrospray, detection in positive-ion mode, sample dissolved in acetonitrile with a trace of ammonium hydroxide).

Example 2

Preparation of a (D,L-lactide) Oligomer with Acid-Alcohol Ends (Mw Close to 1 000 Da)

23.80 g of D,L-lactide (0.165 mol), 200 mL of dichloromethane, 23.73 g of Amberlyst® 15 resin (0.111 mol of acid) and 0.74 mL of water (0.041 mol) are successively introduced into a Schlenk tube equipped with a magnetic stirrier and purged under argon. The reaction mixture is left under stirring at 40° C. for 48 hours. The oligomers are characterized by proton NMR; conversion of the monomer is greater than 95%. The reaction medium is filtered in order to eliminate the resin and the solvent is evaporated off under reduced pressure. The residue is taken up in dichloromethane (6 mL) and poured under stirring into pentane (120 mL). The supernatant is eliminated and, after drying under vacuum, 20.1 g of oligomers (82%) are obtained in the form of a colourless viscous liquid. According to a GPC analysis (Gel Permeation Chromatography) using a calibration produced using polystyrene standards (PS) with masses of 400 to 400 000, the sample is composed of oligomers having neighbouring masses (Mw=917 Dalton, Mw/Mn=1.16). The nature of the acid-alcohol chain ends is determined by mass spectrometry (ionization by electrospray, detection in positive-ion mode, sample dissolved in acetonitrile with a trace of ammonium hydroxide).

Example 3

Preparation of a (D,L-lactide) Oligomer with Ester-Alcohol Ends (Mw<1000 Da)

3.00 g of D, L-lactide (0.021 mol), 20 mL of dichloromethane, 3.12 g of Amberlyst® 15 resin (0.014 mol of acid) and 0.59 mL of pentan-1-ol (0.0054 mol) are successively introduced into a Schlenk tube equipped with a magnetic stirrer and purged under argon. The reaction mixture is left under stirring at 40° C. for 40 hours. The oligomers are characterized by proton NMR; conversion of the monomer is greater than 95%. The reaction medium is filtered in order to eliminate the resin and the solvent is evaporated off under reduced pressure. The residue is taken up in dichloromethane (1 mL) and poured under stirring into pentane (15 mL). The supernatant is eliminated and, after drying under vacuum, 3.2 g of oligomers (89%) are obtained in the form of a colourless viscous liquid. According to a GPC analysis (Gel Permeation Chromatography) using a calibration produced using polystyrene standards (PS) with masses of 400 to 400 000, the sample is composed of oligomers having neighbouring masses (Mw=597 Dalton, Mw/Mn=1.3). The nature of the ester-alcohol chain ends is determined by mass spectrometry (ionization by electrospray, detection in positive-ion mode, sample dissolved in acetonitrile with a trace of ammonium hydroxide).

Example 4

Preparation of a (D,L-lactide/glycolide) 80/20 Co-Oligomer with Ester-Alcohol Ends (Mw<1 000 Da)

1.40 g of D,L-lactide (0.0097 mol), 0.30 g of glycolide (0.0026 mol), 15 mL of dichloromethane, 1.20 g of Amberlyst® 15 resin (0.006 mol of acid) and 0.23 mL of pentan-1-ol (0.002 mol) are successively introduced into a Schlenk tube equipped with a magnetic stirrer and purged under argon. The reaction mixture is left under stirring at 40° C. for 40 hours. The oligomers are characterized by proton NMR; conversion of the monomer is greater than 95%. The ratio of the integrals of the signals corresponding to the polylactide (5.2 ppm) and polyglycolide (4.85 ppm) part makes it possible to evaluate the composition of the copolymer at 79% lactide and 21% glycolide. The reaction medium is filtered in order to eliminate the resin and the solvent is evaporated off under reduced pressure. The residue is taken up in dichloromethane (1 mL) and poured under stirring into pentane (15 mL). The supernatant is eliminated and, after drying under vacuum, 1.45 g of oligomers (86%) are obtained in the form of a colourless viscous liquid. According to a GPC analysis (Gel Permeation Chromatography) using a calibration produced using polystyrene standards (PS) with masses of 400 to 400 000, the sample is composed of oligomers having neighbouring masses (Mw=568 Dalton, Mw/Mn=1.28). The nature of the ester-alcohol chain ends is determined by mass spectrometry (ionization by electrospray, detection in positive-ion mode, sample dissolved in acetonitrile with a trace of ammonium hydroxide).

Example 5

Preparation of a (D,L-lactide/glycolide) 50/50 Co-Oligomer with Ester n-pentyl-alcohol Ends (Mw >1 000 Da)

5.00 g of D,L-lactide (0.035 mol), 5.00 g of glycolide (0.043 mol), 60 mL of dichloromethane, 10.00 g of Amberlyst® (15 resin (0.050 mol of acid) and 1.83 mL of pentan-1-ol (0.0168 mol) are successively introduced into a Schlenk flask equipped with a magnetic stirrier and purged under argon. The reaction mixture is left under stirring at reflux (45° C.) for 40 hours. The oligomers are characterized by proton NMR; conversion of the monomers is greater than 95%. The ratio of the integrals of the signals corresponding to the polylactide (5.20 ppm) and polyglycolide (4.85 ppm) part makes it possible to evaluate the composition of the copolymer at 49% lactide and 51% glycolide. The reaction medium is filtered in order to eliminate the resin and the solvent is evaporated off under reduced pressure. The residue is taken up in dichloromethane (3 mL) and poured under stirring into pentane (44 mL). The supernatant is eliminated and, after drying under vacuum, 7.50 g of oligomers (65%) are obtained in the form of a colourless-whitish viscous liquid. According to a GPC analysis (Gel Permeation Chromatography) using a calibration produced using polystyrene standards (PS) with masses of 400 to 400 000, the sample is composed of oligomers having neighbouring molar masses (Mw=1550 Dalton, Mw/Mn=1.19). The nature of the ester-alcohol chain ends is determined by mass spectrometry (ionization by electrospray, detection in positive-ion mode, sample dissolved in acetonitrile with a trace of ammonium hydroxide).

Example 6

Preparation of a (D,L-lactide/glycolide) 50/50 Co-Oligomer with Ester n-dodecyl-alcohol Ends (Mw>1 000 Da)

5.00 g of D,L-lactide (0.035 mol), 5.00 g of glycolide (0.043 mol), 60 mL of dichloromethane, 10.00 g of Amberlyst® 15 resin (0.050 mol of acid) and 3.82 mL of dodecan-1-ol (0.0168 mol) are successively introduced into a Schlenk flask equipped with a magnetic stirrier and purged under argon. The reaction mixture is left under stirring at reflux (4-5° C.) for 40 hours. The oligomers are characterized by proton NMR; conversion of the monomer is greater than 95%. The ratio of the integrals of the signals corresponding to the polylactide (5.20 ppm) and polyglycolide (4.85 ppm) part makes it possible to evaluate the composition of the copolymer at 53% lactide and 47% glycolide. The reaction medium is filtered in order to eliminate the resin and the solvent is evaporated off under reduced pressure. The residue is taken up in dichloromethane (3 mL) and poured under stirring into pentane (44 mL). The supernatant is eliminated and, after drying under vacuum, 9.50 g of oligomers (72%) are obtained in the form of a colourless-whitish viscous liquid. According to a GPC analysis (Gel Permeation Chromatography) using a calibration produced using polystyrene standards (PS) with masses of 400 to 400 000, the sample is composed of oligomers having neighbouring molar masses (Mw=1470 Dalton, Mw/Mn=1.17). The nature of the ester-alcohol chain ends is determined by mass spectrometry (ionization by electrospray, detection in positive-ion mode, sample dissolved in acetonitrile with a trace of ammonium hydroxide).

Example 7

Preparation of a (D,L-lactide) Oligomer with Ester n-dodecyl-alcohol Ends (Mw>1 000 Da)

5.00 g of D,L-lactide (0.035 mol), 30 mL of dichloromethane, 5.00 g of Amberlyst® 15 resin (0.025 mol of acid) and 1.42 mL of dodecan-1-ol (0.0063 mol) are successively introduced into a Schlenk flask equipped with a magnetic stirrer and purged under argon. The reaction mixture is left under stirring at reflux (45° C.) for 40 hours. The oligomers are characterized by proton NMR; conversion of the monomer is greater than 95%. The reaction medium is filtered in order to eliminate the resin and the solvent is evaporated off under reduced pressure. The residue is taken up in dichloromethane (1.5 mL) and poured under stirring into pentane (22 mL). The supernatant is eliminated and, after drying under vacuum, 4.70 g of oligomers (76%) are obtained in the form of a colourless viscous liquid. According to a GPC analysis (Gel Permeation Chromatography) using a calibration produced using polystyrene standards (PS) with masses of 400 to 400 000, the sample is composed of oligomers having neighbouring molar masses (Mw=1209 Dalton, Mw/Mn=1.3). The nature of the ester-alcohol chain ends is determined by mass spectrometry (ionization by electrospray, detection in positive-ion mode, sample dissolved in acetonitrile with a trace of ammonium hydroxide).

Example 8

Preparation of a (D,L-lactide) Oligomer with Ester n-pentyl-alcohol Ends (Mw>2 000 Da)

10.00 g of D,L-lactide (0.070 mol), 69 mL of dichloromethane, 6.50 g of Amberlyst® 15 resin (0.0326 mol of acid) and 0.50 mL of pentan-1-ol (0.0046 mol) are introduced successively into a Schlenk flask equipped with a magnetic stirrer and purged under argon. The reaction mixture is left under stirring at reflux (45° C.) for 168 hours. The oligomers are characterized by proton NMR; conversion of the monomer is greater than 95%. The reaction medium is filtered in order to eliminate the resin and the solvent is evaporated off under reduced pressure. The residue is taken up in dichloromethane (3 mL) and poured under stirring into pentane (44 mL). The supernatant is eliminated and, after drying under vacuum, 8.20 g of oligomers (79%) is obtained in the form of a white powder. According to a GPC analysis (Gel Permeation Chromatography) with the help of a calibration produced using polystyrene standards (PS) with masses of 400 to 5000, the sample is composed of oligomers having neighbouring molar masses (Mw=2096 Dalton, Mw/Mn=1.27). The nature of the ester-alcohol chain ends is determined by mass spectrometry (ionization by electrospray, detection in positive-ion mode, sample dissolved in acetonitrile with a trace of ammonium hydroxide).

What is claimed is:

1. A catalytic system comprising:
   (a) a styrene and divinylbenzene-based macroreticular resin with sulphonic acid that functions as a strongly acidic ion-exchange resin polymeric catalyst;
   (b) a (co)oligomerization additive of general formula (2)

$$H-O-R^2 \quad (2)$$

$R^2$ represents a hydrogen atom or a group of formula $-E_{14}(R_{14})(R'_{14})(R''_{14})$;
   wherein $E_{14}$ is a carbon atom; $R_{14}$, $R'_{14}$ and $R''_{14}$ represent, independently, a hydrogen atom, or a substituted or non-substituted alkyl radical;
   wherein said substituent or substituents comprise alkyls, carboxys, and alkoxycarbonyls, or mixtures thereof; and
   (c) lactide and/or glycolide monomers;
   wherein the quantity of monomer relative to the quantity of (co)oligomerization additive ranges from 4 to 10 molar equivalents and the conversion of monomer is greater than 95%.

2. The catalytic system of claim 1, wherein the polymeric catalyst comprises a macroreticular Amberlyst® or Dowex® resin.

3. The catalytic system of claim 2, wherein the polymeric catalyst comprises an Amberlyst® resin.

4. The catalytic system of claim 1, wherein the compound of general formula (2) is such that
   E represents an oxygen atom;
   $R^1$ represents a hydrogen atom;
   $R^2$ represents a hydrogen atom or a group of formula $-E_{14}(R_{14})(R'_{14})(R''_{14})$
   wherein $E_{14}$ represents a carbon atom and
   $R_{14}$, $R'_{14}$, and $R''_{14}$ represent, independently, a hydrogen atom or an alkyl radical.

5. The catalytic system of claim 1, wherein the compound of general formula (2) comprises water or an alcohol.

6. The catalytic system of claim 5, wherein the compound of general formula (2) comprises an aliphatic alcohol.

7. The catalytic system of claim 6, wherein the compound of general formula (2) comprises isopropanol, pentan-1-ol, dodecan-1-ol, or mixtures thereof.

8. The catalytic system of claim 1, wherein the (co)oligomerization results in a degree of polymerization is less than 30.

9. A catalytic system comprising:
   (a) a styrene and divinylbenzene-based macroreticular resin with sulphonic acid that functions as a strongly acidic ion-exchange resin polymeric catalyst;
   (b) a (co)oligomerization additive of general formula (2)

$$R^1-E-R^2 (2) \quad (2)$$

wherein:
   E represents an element of group 16;
   $R^1$ represents a hydrogen or deuterium atom;
   $R^2$ represents a hydrogen or deuterium atom, or a group of formula $-E_{14}(R_{14})(R'_{14})(R''_{14})$;
   wherein:
   $E_{14}$ is an element of group 14;
   $R_{14}$, $R'_{14}$ and $R''_{14}$ represent, independently, a hydrogen atom; a deuterium atom;
   or a substituted or non-substituted alkyl, cycloalkyl or aryl,
   wherein said substituent or substituents comprise: halos, hydroxys, alkyls, alkoxys, cycloalkyls, cycloalkoxys, aryls, aryloxys, carboxys, alkoxycarbonyls, cycloalkoxycarbonyls and aryloxycarbonyls or mixtures thereof;
   and
   (c) lactide and/or glycolide monomers;
   wherein the quantity of monomer relative to the quantity of (co)oligomerization additive ranges from 4 to 10 molar equivalents and the conversion of monomer is greater than 95%; and wherein the catalytic system is capable of producing a (co)polymer where the (co)polymer comprises R2-alcohol ends; and/or the polydispersity indexes of the (co)polymer are between 1.0 and 1.4.

10. The catalytic system of claim 1, wherein said catalytic system produces (co)polymers with a mass between 300 and 5,000 Daltons.

11. The catalytic system of claim 10, wherein said catalytic system produces (co)polymers with a mass between 500 and 3,000 Daltons.

12. The catalytic system of claim 1, wherein said catalytic system produces (co)polymers with a mass less than 5,000 Daltons.

13. The catalytic system of claim 9, wherein said catalytic system produces (co)polymers with a mass between 300 and 5,000 Daltons.

14. The catalytic system of claim 13, wherein said catalytic system produces (co)polymers with a mass between 500 and 3,000 Daltons.

15. The catalytic system of claim 9, wherein said catalytic system produces (co)polymers with a mass less than 5,000 Daltons.

* * * * *

UNITED STATES PATENT AND TRADEMARK OFFICE
CERTIFICATE OF CORRECTION

PATENT NO. : 8,389,668 B2 Page 1 of 1
APPLICATION NO. : 10/599020
DATED : March 5, 2013
INVENTOR(S) : Ben et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 6 days.

Signed and Sealed this
First Day of September, 2015

Michelle K. Lee
*Director of the United States Patent and Trademark Office*